United States Patent
Schwarzkopf

Patent Number: 6,025,577
Date of Patent: Feb. 15, 2000

[54] SELF-TIGHTENING ELECTRICAL SLEEVE HEATER

[75] Inventor: Eugen Schwarzkopf, Lüdenscheid, Germany

[73] Assignee: Hotset Heizpatronen U. Zubehor GmbH, Ludenscheid, Germany

[21] Appl. No.: 09/092,785

[22] Filed: Jun. 5, 1998

[30] Foreign Application Priority Data

Oct. 22, 1997 [DE] Germany ............... 197 46 556

[51] Int. Cl.[7] ............... H05B 3/58; H05B 3/40; F22B 29/06
[52] U.S. Cl. ............ 219/535; 219/534; 392/396; 392/397
[58] Field of Search ................... 219/535, 534; 105/77; 425/542, 547, 564, 549; 239/128, 135; 392/396, 347

[56] References Cited

U.S. PATENT DOCUMENTS

| | | | |
|---|---|---|---|
| 3,774,013 | 11/1973 | Keep et al. ............... | 219/535 |
| 3,829,657 | 8/1974 | Hinz ............... | 219/535 |
| 5,080,579 | 1/1992 | Specht ............... | 431/207 |
| 5,460,330 | 10/1995 | Steeb et al. ............... | 239/133 |
| 5,549,078 | 8/1996 | Annecharico et al. ............... | 122/132 |
| 5,667,712 | 9/1997 | Sutorius et al. ............... | 219/535 |
| 5,830,524 | 11/1998 | Braun ............... | 425/549 |
| 5,850,072 | 12/1998 | Eckert ............... | 219/523 |
| 5,871,786 | 2/1999 | Hume et al. ............... | 425/549 |

*Primary Examiner*—Tu Ba Hoang
*Assistant Examiner*—Daniel L. Robinson
*Attorney, Agent, or Firm*—Herbert Dubno; Andrew Wilford

[57] ABSTRACT

An electrical sleeve heater has a tubular outer wall and a heating coil inside the outer wall. An outer sleeve inside the heating coil formed with an axially throughgoing slot having angularly confronting edges is made of a material having a high coefficient of thermal expansion. An inner sleeve inside the outer sleeve is formed with an axially throughgoing slot and with outwardly projecting lips engaged through the outer-sleeve slot bearing angularly on the outer-sleeve slot edges. It is made of a material having a low coefficient of thermal expansion so that when the sleeves are heated the outer-sleeve edges press the inner-sleeve lips together and thereby decrease the radial inner diameter of the inner sleeve.

8 Claims, 2 Drawing Sheets

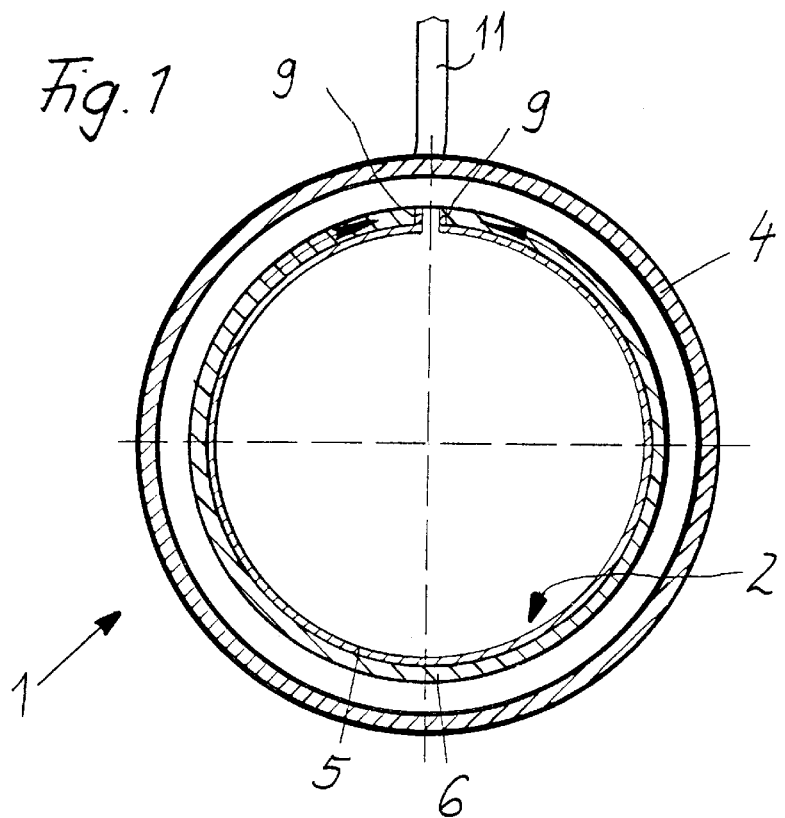
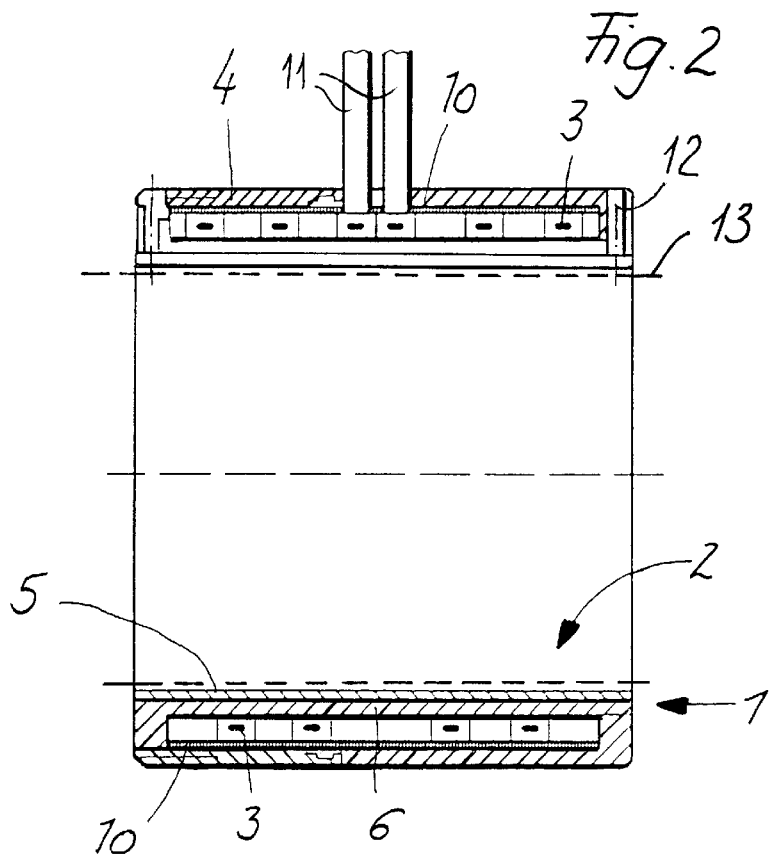

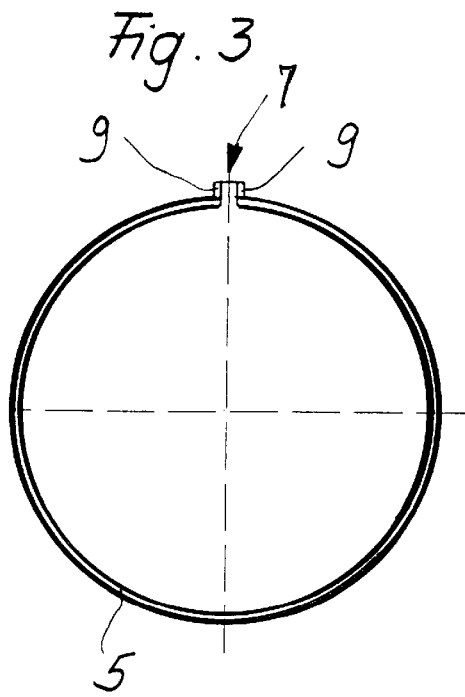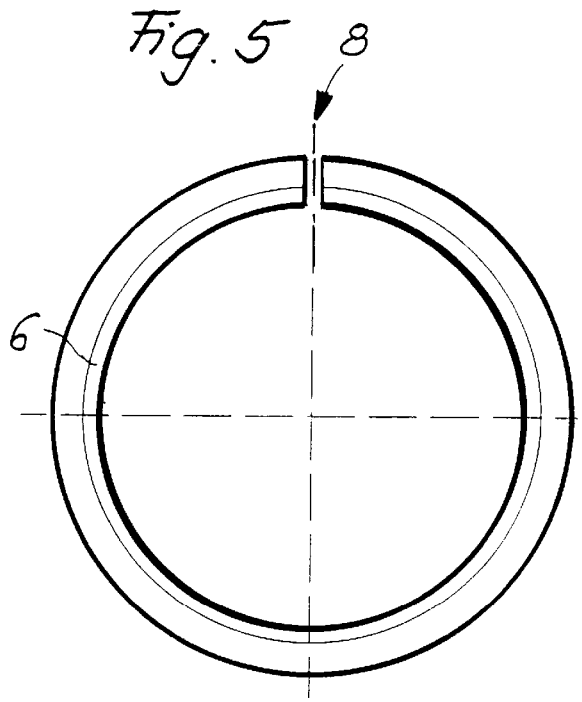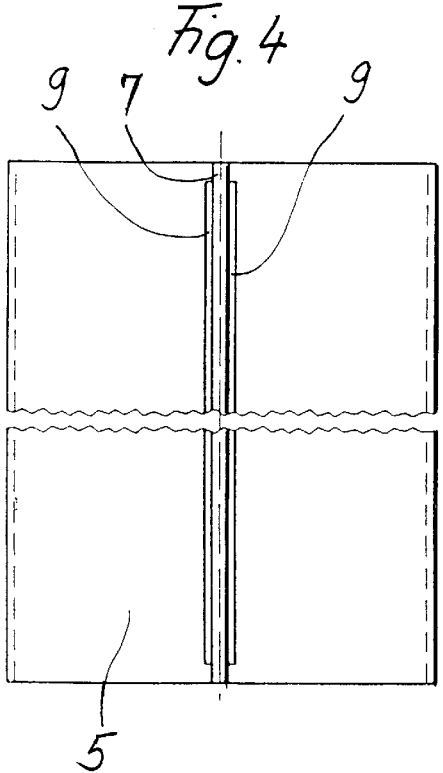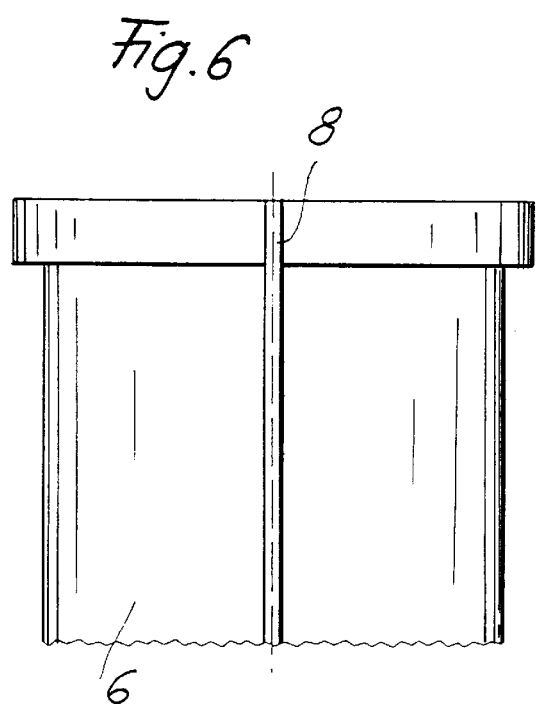

SELF-TIGHTENING ELECTRICAL SLEEVE HEATER

FIELD OF THE INVENTION

The present invention relates to an electrical sleeve heater. More particularly this invention concerns such a heater used to heat an injection-molding nozzle or the like through which passes a material that must be maintained hot.

BACKGROUND OF THE INVENTION

A standard heater used on, for example, a nozzle of an injection-molding machine comprises a tubular inner wall, a helicoidal heater element, e.g. a resistive heating wire, surrounding the inner tube, a tubular outer wall surrounding the heater element, and a mass of insulating material, e.g. magnesium oxide, filling the annular chamber between the tubes around the heater element. Such a sleeve heater is slipped over the outer cylindrical surface of the normally tubular nozzle and the heater element is connected to a source of electricity. When electricity is passed through the heating element, it heats and this heat is transmitted through the oxide electrical insulation to the inner wall and thence to the outer surface of the object, i.e. the nozzle, the heater is fitted around.

It is, obviously, essential that the sleeve heater fit as snugly as possible around the object being heated for best possible heat conduction between its inner wall and the outer surface of the object. At the same time it must be loose enough that it can be slipped on and of since such a heater is subject to considerable stress and must be removable. Thus there is a tradeoff between the tight fit necessary for good heat transmission and the looseness needed to make removal and replacement possible.

OBJECTS OF THE INVENTION

It is therefore an object of the present invention to provide an improved electrical sleeve heater.

Another object is the provision of such an improved electrical sleeve heater which overcomes the above-given disadvantages, that is which can be easily removed from and fitted over the object yet that will be tight when in use.

SUMMARY OF THE INVENTION

An electrical sleeve heater has according to the invention a tubular outer wall and a heating coil inside the outer wall. An outer sleeve inside the heating coil formed with an axially throughgoing slot having angularly confronting edges is made of a material having a high coefficient of thermal expansion. An inner sleeve inside the outer sleeve is formed with an axially throughgoing slot and with outwardly projecting lips engaged through the outer-sleeve slot bearing angularly on the outer-sleeve slot edges. It is made of a material having a low coefficient of thermal expansion so that when the sleeves are heated the outer-sleeve edges press the inner-sleeve lips together and thereby decrease the radial inner diameter of the inner sleeve.

Thus with this system the inner diameter of the inner sleeve can be slightly more than the outer diameter of the object it is being used to heat so that it can be installed and removed easily. When the electrical heating coil is energized, however, the heated outer sleeve will expand, forcing together the lips of the inner sleeve and decreasing its diameter so that it will decrease in radial inner diameter and tightly hug the object. The system therefore only tightens itself to the object being heated when it is actively heating this object, and does this using nothing other than thermal expansion, that is without any mechanical clamping system.

According to the invention the lips are formed at edges of the inner-sleeve slot. The material of the inner sleeve includes titanium and that of the outer sleeve includes aluminum. In addition the outer wall is an unslotted tube formed of a material with a low coefficient of thermal expansion, again titanium or a titanium alloy. Thus the outer sleeve is in effect braced radially outward against the outer wall, normally via a mass of thermal insulation surrounding the heating element between the outer sleeve and outer wall, so that, when the outer sleeve expands, it has nowhere to go but inward.

The outer wall is formed of a pair of similar centrally joined tube sections having interfitting ends. Thus the device can be assembled easily, normally with the power leads for the heating element extending centrally out from between the outer-wall sections.

BRIEF DESCRIPTION OF THE DRAWING

The above and other objects, features, and advantages will become more readily apparent from the following description, reference being made to the accompanying drawing in which:

FIG. 1 is a cross section through the heater according to the invention;

FIG. 2 is an axial section through the heater;

FIGS. 3 and 4 are end and top views of the inner sleeve of the heater; and FIGS. 5 and 6 are end and top views of the outer sleeve of the heater.

SPECIFIC DESCRIPTION

As seen in FIGS. 1 and 2 a sleeve heater 1 according to the invention basically comprises a cylindrically tubular inner wall 2, a helical heating element 3 surrounding this wall 2, and a cylindrically tubular outer wall 4 coaxially surrounding the element 3 and inner wall 2. An insulating mass 10, for example of magnesium oxide, typically fills the annular space between and around the turns of the heater coil 3 between the inner and outer walls 2 and 4.

In accordance with the invention the cylindrically tubular inner wall 2 is formed as shown in FIGS. 3 and 4 by a relatively thin inner sleeve 5 formed with an axially through-going straight slot 7 and a somewhat thicker outer sleeve 6 formed as shown in FIGS. 5 and 6 with its own axially through-going straight slot 8 aligned radially with the inner slot 7. In addition the inner sleeve 5 is formed along the edges of the slot 7 with radially outwardly projecting straight lips 9 that fit within the slot 8 of the outer sleeve 6 so that the edges of the sleeve 6 defining this slot 8 angularly abut the lips 9.

The inner sleeve 5 is wholly formed of a metal such as titanium or a titanium alloy that has a low coefficient of thermal expansion. The outer sleeve 5, however, is formed of a metal such as aluminum or an aluminum alloy that has a much higher coefficient of thermal expansion. In addition the outer sleeve 6 is actually formed of two generally identical sleeve halves that fit together axially centrally adjacent a location where a wire 11 connected to an unillustrated electric-power source and leading from the heater element 3 exits the heater. Outer ends of the outer wall 4, which is made of the same low-expansion material as the inner sleeve 5, are provided with flanges 12 that are fixed to outer ends of inner sleeve 5 and that axially contain the heating element 3.

Thus when the heater 1 gets hot, the outer sleeve 6 will expand more than the inner sleeve 5 and will push together the lips 9 because it cannot expand outward due to the angularly continuous or tubular construction of the outer wall 4. This action will compress the inner sleeve 5 radially inward into tight engagement with a cylindrical outer surface of an object shown in dashed lines 13 in FIG. 2. When the heater 1 cools off, the effect is reversed so that the heater 1 can easily be removed, if necessary.

I claim:

1. An electrical sleeve heater comprising:

a tubular outer wall;

a heating coil inside the outer wall;

an outer sleeve inside the heating coil, formed with an axially throughgoing slot having angularly confronting edges, and formed of a material having a predetermined relatively high coefficient of thermal expansion; and an inner sleeve inside the outer sleeve, formed with an axially throughgoing slot and with outwardly projecting lips engaged through the outer-sleeve slot and bearing angularly on the outer-sleeve slot edges, and formed of a material having a predetermined relatively low coefficient of thermal expansion, whereby when the sleeves are heated the outer-sleeve edges press the inner-sleeve lips together and thereby decrease the radial inner diameter of the inner sleeve.

2. The electrical sleeve heater defined in claim 1 wherein the lips are formed at edges of the inner-sleeve slot.

3. The electrical sleeve heater defined in claim 1 wherein the material of the inner sleeve includes titanium.

4. The electrical sleeve heater defined in claim 1 wherein the material of the outer sleeve includes aluminum.

5. The electrical sleeve heater defined in claim 1 wherein the outer wall is an unslotted tube formed of a material with a low coefficient of thermal expansion.

6. The electrical sleeve heater defined in claim 5 wherein the material of the outer wall includes titanium.

7. The electrical sleeve heater defined in claim 5 wherein the outer sleeve bears radially outward on the outer wall.

8. The electrical sleeve heater defined in claim 1, further comprising a body of thermal insulation surrounding the coil between the outer sleeve and the outer wall.

* * * * *